(12) United States Patent
Deindorfer et al.

(10) Patent No.: US 10,655,782 B2
(45) Date of Patent: May 19, 2020

(54) PRESSURE VESSEL AND ALSO APPARATUS AND PROCESS FOR PRODUCING A PRESSURE VESSEL BLANK COMPRISING AT LEAST ONE CONNECTION ELEMENT

(71) Applicant: KAUTEX TEXTRON GMBH & CO. KG, Bonn (DE)

(72) Inventors: Rolf Deindorfer, Siegburg (DE); Dieter Langen, Bonn (DE)

(73) Assignee: KAUTEX TEXTRON GMBH & CO. KG, Bonn (DE)

( * ) Notice: Subject to any disclaimer, the term of this patent is extended or adjusted under 35 U.S.C. 154(b) by 464 days.

(21) Appl. No.: 15/501,740

(22) PCT Filed: Jun. 9, 2015

(86) PCT No.: PCT/EP2015/062809
§ 371 (c)(1),
(2) Date: Feb. 3, 2017

(87) PCT Pub. No.: WO2016/020089
PCT Pub. Date: Feb. 11, 2016

(65) Prior Publication Data
US 2017/0234486 A1 Aug. 17, 2017

(30) Foreign Application Priority Data
Aug. 6, 2014 (DE) .................. 10 2014 215 556

(51) Int. Cl.
*B29C 49/04* (2006.01)
*B29C 49/20* (2006.01)
(Continued)

(52) U.S. Cl.
CPC ............... *F17C 1/04* (2013.01); *B29C 35/16* (2013.01); *B29C 49/04* (2013.01); *B29C 49/20* (2013.01);
(Continued)

(58) Field of Classification Search
CPC ...... B29C 2049/044; B29C 2049/2026; B29C 2049/2043; B29C 2049/2073;
(Continued)

(56) References Cited

U.S. PATENT DOCUMENTS 3,197,851 A * 8/1965 Aleck .................... B21D 51/24
220/581
4,539,172 A * 9/1985 Winchell ................ B29C 49/04
264/515
(Continued)

FOREIGN PATENT DOCUMENTS

CA 2376670 C 3/2001
CN 1294546 A 5/2001
(Continued)

OTHER PUBLICATIONS

International Preliminary Report on Patentability dated Feb. 16, 2017, in International Patent Application No. PCT/EP2015/062809, filed Jun. 9, 2015.
(Continued)

*Primary Examiner* — Robert B Davis
(74) *Attorney, Agent, or Firm* — Wiley Rein LLP

(57) ABSTRACT

The present embodiments provide an apparatus for producing a pressure vessel blank, comprising at least one connection element, a multi-part blow-moulding tool, and at least one blowing pin. The present embodiments further provide a pressure vessel comprising at least one connection element, a pressure vessel blank, and a supporting shell connected to and supporting the pressure vessel blank. An aspect of the present embodiments provides a process for producing a pressure vessel blank using an apparatus comprising at least one connection element that enables a shortened time for producing a pressure vessel blank with increased stability under pressure.

22 Claims, 5 Drawing Sheets

(51) Int. Cl.
| | |
|---|---|
| *B29C 49/58* | (2006.01) |
| *F17C 1/04* | (2006.01) |
| *B29C 49/66* | (2006.01) |
| *F17C 1/06* | (2006.01) |
| *B29C 35/16* | (2006.01) |
| *B29L 31/00* | (2006.01) |
| *B29K 23/00* | (2006.01) |
| *B29K 671/00* | (2006.01) |
| *B29K 705/00* | (2006.01) |
| *B29K 709/08* | (2006.01) |
| *B29K 307/04* | (2006.01) |
| *B29K 705/02* | (2006.01) |
| *B29K 703/00* | (2006.01) |
| *B29K 101/12* | (2006.01) |
| *B29K 681/00* | (2006.01) |
| *B29K 67/00* | (2006.01) |
| *B29K 105/06* | (2006.01) |
| *B29K 105/00* | (2006.01) |

(52) U.S. Cl.
CPC ............ *B29C 49/58* (2013.01); *B29C 49/66* (2013.01); *F17C 1/06* (2013.01); *B29C 2035/1616* (2013.01); *B29C 2035/1666* (2013.01); *B29C 2049/2008* (2013.01); *B29C 2049/2017* (2013.01); *B29C 2049/2026* (2013.01); *B29C 2049/2043* (2013.01); *B29C 2049/2065* (2013.01); *B29C 2049/2073* (2013.01); *B29C 2049/2078* (2013.01); *B29C 2049/2082* (2013.01); *B29C 2049/5803* (2013.01); *B29C 2049/5855* (2013.01); *B29C 2049/5886* (2013.01); *B29C 2049/5889* (2013.01); *B29C 2049/6607* (2013.01); *B29K 2023/065* (2013.01); *B29K 2023/0633* (2013.01); *B29K 2023/086* (2013.01); *B29K 2067/003* (2013.01); *B29K 2101/12* (2013.01); *B29K 2105/06* (2013.01); *B29K 2105/258* (2013.01); *B29K 2307/04* (2013.01); *B29K 2671/00* (2013.01); *B29K 2677/10* (2013.01); *B29K 2681/04* (2013.01); *B29K 2703/00* (2013.01); *B29K 2705/00* (2013.01); *B29K 2705/02* (2013.01); *B29K 2709/08* (2013.01); *B29L 2031/7156* (2013.01); *F17C 2201/0109* (2013.01); *F17C 2201/056* (2013.01); *F17C 2203/0604* (2013.01); *F17C 2203/066* (2013.01); *F17C 2203/0619* (2013.01); *F17C 2203/0621* (2013.01); *F17C 2203/0663* (2013.01); *F17C 2205/0305* (2013.01); *F17C 2205/0397* (2013.01); *F17C 2221/012* (2013.01); *F17C 2221/033* (2013.01); *F17C 2221/035* (2013.01); *F17C 2223/0123* (2013.01); *F17C 2223/0153* (2013.01); *F17C 2223/033* (2013.01); *F17C 2223/036* (2013.01); *F17C 2270/0168* (2013.01); *Y02E 60/321* (2013.01)

(58) Field of Classification Search
CPC .... B29C 2049/5855; B29C 2049/5886; B29C 2049/5889
See application file for complete search history.

(56) References Cited

U.S. PATENT DOCUMENTS

| | | | |
|---|---|---|---|
| 2005/0006393 | A1 | 1/2005 | Carter |
| 2006/0061009 | A1 | 3/2006 | Clack |
| 2010/0255234 | A1 | 10/2010 | Koetke |
| 2015/0125566 | A1* | 5/2015 | Heim .................... B29C 49/20 425/536 |

FOREIGN PATENT DOCUMENTS

| | | | | |
|---|---|---|---|---|
| CN | 203019665 | U | 6/2013 | |
| DE | 102008039573 | A1 | 4/2009 | |
| DE | 102009015964 | A1 | 10/2010 | |
| DE | 112012001543 | T5 | 12/2013 | |
| EP | 1850058 | A1 | 10/2007 | |
| EP | 2236903 | A1 | 10/2010 | |
| FR | 2405809 | A1 | 5/1979 | |
| FR | 3020306 | B1 * | 5/2016 | .............. F15B 1/106 |
| JP | H09119598 | A | 5/1997 | |
| JP | H1170565 | A | 3/1999 | |

OTHER PUBLICATIONS

Office Action dated Aug. 20, 2018, in related Chinese Patent Application No. 201580054285.2, filed Jun. 9, 2015.
International Search Report and Written Opinion dated Jan. 22, 2016, in related International Patent Application No. PCT/EP2015/062809, filed Jun. 9, 2015.

* cited by examiner

PRESSURE VESSEL AND ALSO APPARATUS AND PROCESS FOR PRODUCING A PRESSURE VESSEL BLANK COMPRISING AT LEAST ONE CONNECTION ELEMENT

RELATED APPLICATIONS

This Application is a § 371 National Stage Application of PCT/EP2015/062809, filed Jun. 9, 2015, which claims priority benefit of German Application No. 102014215556.8, filed Aug. 6, 2014, which applications are incorporated entirely by reference herein for all purposes.

The present invention relates to a pressure vessel and also to an apparatus and a process for producing a pressure vessel blank comprising at least one connection element, in particular for motor vehicles, for receiving pressurized gases and/or liquids, in particular pressurized hydrogen, natural gas and/or liquefied petroleum gas. Pressure vessels usually comprise a pressure vessel blank, also to be referred to as an inner vessel, which is for example formed from a thermoplastic material, and a supporting shell enclosing the pressure vessel blank. In the pressure vessel, one or two connection elements are provided at the ends for connecting valve devices for example.

Pressure vessels are used for storing pressurized gases and/or pressurized liquids. For instance, pressure vessels are used in motor vehicles operated with natural gas. Also known are pressure vessels for motor vehicles that are filled with pressurized hydrogen. The hydrogen can be burned in an internal combustion engine with oxygen or react with oxygen in a fuel cell to form water, the electrical energy obtained being fed to a rechargeable battery or an electric motor.

Corresponding pressure vessels must withstand great loads. For example, pressure vessels for natural gas are filled at a pressure of up to 250 bar, and pressure vessels for hydrogens are even filled at up to 700 bar.

On account of this high pressure loading, the pressure vessels must be of a correspondingly stable configuration. In particular, the connecting region between the pressure vessel blank (that is to say the inner vessel of the pressure vessel) and the connection element is particularly critical, since the pressure vessel blank is usually formed from a thermoplastic material, whereas the connection element is usually produced from a metal, for example aluminium. Furthermore, it is desirable to produce a pressure vessel in as short a time as possible, that is to say with a low cycle time, in order on the one hand that sufficient pressure vessels can be produced within a given time, and on the other hand that the apparatus for producing the pressure vessel is used as efficiently as possible.

These two requirements, that is to say on the one hand the requirement for a pressure vessel that is as stable as possible, and on the other hand the requirement for a production time for the pressure vessel that is as short as possible, are at odds with one another and can only be reconciled with difficulty.

DE 10 2009 015 964 A1 discloses a pressure vessel blank of a thermoplastic material in the neck of which there is fitted a connection element, which is arranged on the inside of the pressure vessel blank and is enclosed by thermoplastic material. In this case, the connection element comprises a multiplicity of openings, which are filled with the thermoplastic material, in order that the connection between the connection element and the pressure vessel blank is strengthened.

In the production of a corresponding pressure vessel blank, the connection element is usually heated up, so that, when the still warm-plastic preform is brought into contact with the connection element, the preform does not cool down too quickly at the contact point with the connection element, so that, when moulding the preform to form the pressure vessel blank, the preform continues to remain deformable also in the contact region with the connection element. The time for the production of a pressure vessel blank known from DE 10 2009 015 964 A1 is correspondingly long, since the blow-mould halves that form the cavity in which the blow moulding of the pressure vessel blank is completed can only be moved back into their open position when the connection between the connection element and the pressure vessel blank is sufficiently stable. The cooling-down time is in this case usually several minutes.

The object on which the present invention is based is that of providing an apparatus for producing a pressure vessel blank comprising at least one connection element that makes it possible to obtain a shortened production time for a pressure vessel blank, which also has an increased stability under pressure.

Furthermore, the object on which the present invention is based is that of providing a process for producing a pressure vessel blank comprising at least one connection element that ensures a shortened production time for producing the pressure vessel blank, and by means of which pressure vessel blanks with increased stability under pressure can be produced.

Finally, the present invention is also based on the object of improving a pressure vessel in such a way that the cycle time for the production thereof is shortened.

The object on which the present invention is based is achieved by an apparatus for producing a pressure vessel blank comprising at least one connection element with the features of claim 1. Advantageous embodiments are described in the claims that are dependent on claim 1. Furthermore, the object on which the present invention is based is achieved by a pressure vessel with the features of claim 17 and by a pressure vessel with the features of claim 19. Advantageous configurations are described in the claims that are dependent on claim 17 and the claims that are dependent on claim 19. Furthermore, the object on which the present invention is based is achieved by a process for producing a pressure vessel blank comprising at least one connection element according to the features of claim 23. Advantageous refinements of the process are described in the claims that are dependent on claim 23.

More precisely, the apparatus comprises a multi-part blow-moulding tool with at least two blow-mould halves, which in each case have a partial cavity and between which a tubular preform consisting of thermoplastic material can be positioned in an open position of the blow-mould halves. The blow-mould halves can be made to move between an open position, in which the blow-mould halves are apart from one another, and a closed position, in which the blow-mould halves are in contact with one another, the partial cavities forming in the closed position a mould impression in which the preform can be moulded to form the pressure vessel blank by means of applying differential pressure. Furthermore, the apparatus comprises at least one blowing pin, which has a gas outlet opening, arranged in an end portion of the blowing pin, for discharging a gas and a holding device for releasably holding the connection element, the end portion of the blowing pin being insertable into a through-passage of the connection element. The blowing pin can be positioned between the blow-mould halves, so that in the closed position of the blow-mould halves the preform positioned between them can be moulded in the mould impression while being brought to bear against the connection element—by application of gas pressure by way of the gas outlet opening. The apparatus according to the invention is characterized in that the blowing pin has a fluid outlet, arranged in the end portion, for discharging a cooling fluid and a fluid inlet, arranged in the end portion, for receiving the cooling fluid. The fluid outlet and the fluid inlet are in this case in fluidic connection with one another, so that the through-passage of a connection element held by the blowing pin can be brought directly into contact with the cooling fluid and a cooling fluid circulation can be produced in the through-passage of the connection element.

The apparatus can be positioned under an extrusion die head for extruding a tubular preform and may possibly also comprise this extrusion die head.

A correspondingly formed apparatus offers the advantage that, after bringing the connection element into contact with the still warm-plastic preform and after applying pressure, or else while applying pressure, to the preform, a cooling fluid can be applied directly to a connection element heated up to the temperature of the still warm-plastic preform, so that the heat of the connection element can be removed particularly effectively, whereby the time for cooling down the connection element, and consequently the time after which the blow-mould halves can be made to move back into their open position in order to remove the pressure vessel blank from the blow-moulding tool, is greatly reduced. In this way it is ensured that the preform can come to bear optimally against the contour of the connection element, since the connection element is at a temperature that corresponds substantially to that of the still warm-plastic preform, it being ensured at the same time that the time until the connection element is released from the blowing pin and the blow-moulding tool is transferred into its open position is reduced.

The holding device of the blowing pin is preferably formed as a threaded portion, most preferably as an externally threaded portion, of the blowing pin. In order that the blowing pin can be supplied with compressed air for example, it must of course have a corresponding connection. In order that the blowing pin can also be supplied with a cooling fluid, the blowing pin must of course also have a corresponding mimicking connection means, so that the blowing pin can be connected to a cooling fluid feed line and a cooling fluid removal line. After ending the application of cooling fluid to the connection element, the fluid outlet of the blowing pin can preferably be connected to a gas pressure source or a negative pressure device, so that cooling fluid that is possibly located in the through-passage can be blown out by means of compressed air or can be sucked away by means of negative pressure.

This offers the advantage that no cooling fluid can get into the pressure vessel blank during the release of the connection element from the blowing pin.

The apparatus preferably comprises a second multi-part blow-moulding tool with at least two blow-mould halves, which in each case have a partial cavity and between which a tubular preform consisting of thermoplastic material can be positioned in an open position of the blow-mould halves. In this case, the blow-mould halves can be made to move between an open position, in which the blow-mould halves are apart from one another, and a closed position, in which the blow-mould halves are in contact with one another, the partial cavities forming in the closed position a mould impression in which the preform can be moulded to form the pressure vessel blank by means of applying differential pressure. Furthermore, the apparatus comprises at least one further blowing pin, which has a gas outlet opening, arranged in an end portion of the blowing pin, for discharging a gas and a holding device for releasably holding the connection element, the end portion of the blowing pin being insertable into a through-passage of the connection element. The blowing pin can be positioned between the blow-mould halves, so that in the closed position of the blow-mould halves the preform positioned between them can be moulded in the mould impression while being brought to bear against the connection element by application of gas pressure by way of the gas outlet opening. Furthermore, the blowing pin has a fluid outlet, arranged in the end portion, for discharging a cooling fluid and a fluid inlet, arranged in the end portion, for receiving the cooling fluid. The fluid outlet and the fluid inlet are in this case in fluidic connection with one another, so that the through-passage of a connection element held by the blowing pin can be brought directly into contact with the cooling fluid and a cooling fluid circulation can be produced in the through-passage of the connection element. To this extent, the advantageous apparatus comprises a second multi-part blow-moulding tool that is formed substantially identically to the first multi-part blow-moulding tool. In the case of the advantageous refinement of the apparatus, the first blow-moulding tool and the second blow-moulding tool can be made to move in relation to one another, so that the first blow-moulding tool and the second blow-moulding tool can be made to move under an extrusion die head and both transversely in relation to a direction of extrusion of the preform and transversely in relation to a direction of the opening and closing movement of the blow-mould halves.

The cycle time for producing a pressure vessel blank is further shortened by a correspondingly formed apparatus, since, during the continuous extrusion of the extrudate or of the preforms, an already separated preform can be held by the first blow-moulding tool and be moulded in it, this time for the moulding of the preform being used to extrude a further preform, which is extruded between the opened blow-mould halves of the second blow-moulding tool. Since the time that is necessary until the preform within the first blow-moulding tool has cooled down is relatively short, which is brought about by the direct application of cooling fluid to the through-passage of the connection element/the connection elements, the apparatus can produce a multiplicity of pressure vessel blanks extremely effectively and with very short cycle times. The blowing pin preferably has a wall that extends substantially radially away from the end portion and forms with the through-passage of the connection element a fluid channel, by way of which the fluid outlet is in fluidic connection with the fluid inlet of the blowing pin.

For example, the wall may be such that the fluid channel thus formed is led around the end portion of the blowing pin in a meandering and/or spiral form.

The cooling fluid flow is directed by the wall into the through-passage, so that an improved heat transfer from the connection element to the cooling fluid is achieved, whereby the connection element can be cooled even more quickly to the temperature at which the blowing pin can be removed from the through-passage and the moulds of the tool can be transferred into their open position without the connection element being detached from the pressure vessel, and without the strength of the connection between the connection element and the pressure vessel blank being reduced.

The blowing pin preferably comprises a seal, by means of which the through-passage can be sealed off, so that no fluid escapes from the through-passage.

In a further preferred configuration, the holding device of the blowing pin adjoins the end portion thereof, it being possible to seal off the through-passage by means of the holding device, so that no cooling fluid escapes from the through-passage.

A corresponding form of the apparatus offers the advantage that the holding device assumes both the functionality of holding the connection element and the functionality of sealing off the through-passage. As a result, the complexity of the apparatus, and in particular of the blowing pin, is reduced.

The apparatus preferably comprises a displacing device, by means of which the connection element held by means of the blowing pin can be displaced and/or subjected to the application of force in the direction of a mouth of the pressure vessel blank that is adjacent thereto, into the warm-plastic preform, and consequently into the preform, so that a thinning of the material of the preform connected to the connection element is brought about.

The thinning of the material of the preform can be compensated by a corresponding coating of thermoplastic material being provided on the connection element.

As a result, a more intimate connection is achieved between the connection element and the pressure vessel blank. Furthermore, the cycle rate of the apparatus can be increased by a corresponding form of the apparatus, since the production time for the pressure vessel blank is further reduced. Furthermore, the strength of the connection between the connection element and the pressure vessel blank is increased by a corresponding form of the apparatus, so that the overall load-bearing capacity of a pressure vessel comprising the pressure vessel blank is increased.

The apparatus is preferably formed for the purpose of producing a pressure vessel blank comprising at least two connections. In this case, the apparatus comprises in addition to the blowing pin a holding pin opposite from the blowing pin for releasably holding a second connection element. The holding pin has a holding device for releasably holding the further connection element, an end portion of the holding pin being insertable into a through-passage of the second connection element. The holding pin can be positioned between the blow-mould halves, so that in the closed position of the blow-mould halves the preform positioned between them can be moulded in the mould impression while being brought to bear against the second connection element by application of gas pressure. Furthermore, the holding pin has a fluid outlet, arranged in the end portion, for discharging a cooling fluid and a fluid inlet, arranged in the end portion, for receiving the cooling fluid. The fluid outlet and the fluid inlet are in this case in fluidic connection with one another, so that the through-passage of a second connection element held by the holding pin can be brought directly into contact with the cooling fluid and a cooling fluid circulation can be produced in the through-passage of the second connection element.

The connection element that is held by the blowing pin can also be referred to as the first connection element.

A correspondingly formed apparatus offers the advantage that, after bringing the connection element into contact with the still warm-plastic preform and after applying pressure, or else while applying pressure, to the preform, a cooling fluid can also be applied directly to a second connection element heated up to the temperature of the still warm-plastic preform, so that the heat of the second connection element can be removed particularly effectively, whereby the time for cooling down the connection element, and consequently the time after which the blow-mould halves can be made to move back into their open position and the time until the holding pin can be removed from the second connection element, is greatly reduced. In this way it is ensured that the preform can come to bear optimally against the contour of the second connection element, since the second connection element is at a temperature that is substantially identical to the temperature of the still warm-plastic preform, it being ensured at the same time that the time until the blow-moulding tool is transferred into its open position is reduced.

In this case, the holding device of the holding pin is also preferably formed as a threaded portion, most preferably as an externally threaded portion, of the holding pin. In order that the holding pin can be supplied with a cooling fluid, it must of course also have a corresponding mimicking connection means, so that the holding pin can be connected to a cooling fluid feed line and a cooling fluid removal line. After ending the application of cooling fluid to the second connection element, the fluid outlet of the holding pin can preferably be connected to a gas pressure source, so that cooling fluid that is possibly located in the through-passage of the second connection element can be blown out by means of compressed air. This has the advantage that no cooling fluid can get into the pressure vessel blank during the release of the connection element from the holding pin.

The holding pin preferably has a gas outlet opening, arranged in the end portion thereof, for discharging a gas, wherein in the closed position of the blow-mould halves the preform positioned between them can be moulded in the mould impression while being brought to bear against the second connection element by application of gas pressure by way of the gas outlet opening of the holding pin. In this case, the holding pin also serves as a blowing pin.

This has the advantage that the preform can be moulded to form the pressure vessel blank by two gas pressure sources in a shortened time, so that the cycle time for producing the pressure vessel blank is further shortened.

The holding pin preferably has a wall that extends substantially radially away from the end portion thereof and forms with the through-passage of the second connection element a fluid channel, by way of which the fluid outlet is in fluidic connection with the fluid inlet of the holding pin.

The cooling fluid flow in the through-passage is directed by the wall of the holding pin in the end portion thereof in such a way that an improved heat transfer from the second connection element to the cooling fluid is achieved, whereby the second connection element can be cooled down more quickly to the temperature at which the holding pin can be removed from the through-passage without the pressure vessel blank being deformed during this releasing operation. Therefore, the cycle time for producing the pressure vessel blank is shortened.

The holding pin preferably comprises a seal, by means of which the through-passage of the second connection element can be sealed off, so that no cooling fluid escapes from the through-passage.

The holding device of the holding pin also preferably adjoins the end portion thereof, it being possible to seal off the through-passage of the second connection element by means of the holding device, so that no cooling fluid escapes from the through-passage.

A correspondingly formed holding pin offers the advantage that the holding device assumes both the functionality of holding the second connection element and the sealing off of the through-passage of the second connection element. As a result, the complexity of the holding pin is reduced.

The apparatus preferably comprises a second displacing device, by means of which the second connection element held by means of the holding pin can be displaced and/or subjected to the application of force in the direction of a second mouth of the pressure vessel blank that is adjacent thereto, into the warm-plastic preform, so that a thinning of the material of the preform connected to the second connection element is brought about.

As a result of a corresponding form of the apparatus, a more intimate connection is achieved between the second connection element and the pressure vessel blank, whereby the resistance to pressure of a pressure vessel comprising the pressure vessel blank is increased. Furthermore, as a result, the cycle rate of the apparatus can be increased, since the production time for the pressure vessel is reduced.

The direction of the displacement of and/or the application of force to the first connection element is preferably opposed to the direction of the displacement of and/or the application of force to the second connection element. The displacement of and/or the application of force to the first connection element also preferably takes place substantially at the same time as the displacement of and/or the application of force to the second connection element.

This ensures a shortened production time for producing a pressure vessel blank comprising two connection elements, it continuing to be ensured that both the first connection element and the second connection element enter into an intimate connection with the pressure vessel blank.

The apparatus preferably comprises a separating device for separating the preform from an extrudate extruded from an extrusion die head. The apparatus also comprises a gripping and/or holding device for gripping and/or holding the preform between the blow-mould halves located in the open position.

If, for example, a pressure vessel blank comprising only one layer of material is produced, the apparatus can operate discontinuously, that is to say that the extrudate is not extruded continuously but discontinuously. This makes it possible to produce a corresponding pressure vessel blank without the entire apparatus having to be moved away from under the extrusion die head, both the blowing pin and the holding pin continuing to be positionable in the not yet extruded preform without the apparatus having to be moved away from under the extrusion die head.

The apparatus is preferably displaceable transversely in relation to a direction of extrusion of the preform. Transversely in relation to the direction of extrusion of the preform therefore means a displacement in a horizontal direction, since the direction of extrusion of the preform follows gravitational force, that is to say is formed perpendicularly.

A corresponding form of the apparatus allows the extrudate to be extruded continuously from the extrusion die head, which is necessary in particular if the extrudate is of a multi-layered form and for example the pressure vessel blank comprises a barrier layer. By moving the apparatus out from a receiving position for receiving the preform, it can be ensured even in the case of a multi-layered preform that both the blowing pin and the holding pin can be positioned in the preform, whereby the cycle rate of the apparatus can be increased.

Furthermore, the object on which the present invention is based is achieved by a pressure vessel that comprises at least one connection element, a pressure vessel blank and a supporting shell enclosing the pressure vessel blank and connected to the pressure vessel blank, the connection element having a sleeve-shaped neck portion and a shoulder portion, and the connection element being connected to an inner surface of the pressure vessel blank by way of an outer surface of the neck portion and/or of the shoulder portion. The pressure vessel according to the invention is characterized in that the pressure vessel blank has an at least three-layered wall structure, the wall structure comprising a stabilizing layer, a coupling agent layer and a barrier layer, the coupling agent layer being arranged between the stabilizing layer and the barrier layer and the stabilizing layer facing the supporting shell.

In the case of pressure vessels that are known from the prior art, the pressure vessel blank usually has a five-layered structure. The heat transfer from one layer to another layer is not at an optimum because of the interface between these, so that cooling down of a pressure vessel blank having this many layers proceeds quite slowly. Providing a pressure vessel blank that has only three layers allows the material of the pressure vessel blank to be cooled down particularly quickly after the final blow moulding of the pressure vessel blank. In particular in combination with the direct application of cooling fluid to the through-passage of the connection element, the pressure vessel blank is cooled down particularly effectively in the region of the contact with the connection element, so that as a result the necessary time until the blow-moulding tool can be made to move back into the open position without deformation of the pressure vessel blank having to be feared is again further shortened.

The stabilizing layer may for example be formed as an HDPE layer (HDPE=high-density polyethylene), whereas the coupling agent layer may be formed for example as an LDPE layer (LDPE=low-density polyethylene). The barrier layer may be layer of EVOH or a layer of a polyamide.

In this case, the wall structure of the pressure vessel blank preferably consists only of the stabilizing layer, the coupling agent layer and the barrier layer, it being possible to bring the barrier layer into direct contact with the fluid to be stored in the pressure vessel.

Furthermore, the object on which the present invention is based is achieved by a pressure vessel that comprises at least one connection element, a pressure vessel blank and a supporting shell enclosing the pressure vessel blank and connected to the pressure vessel blank, the connection element having a sleeve-shaped neck portion and a shoulder portion, and the connection element being connected to an inner surface of the pressure vessel blank by way of an outer surface of the neck portion and/or of the shoulder portion. The pressure vessel according to the invention is characterized in that the connection element is formed from a fibre-reinforced plastic.

The advantage of a correspondingly formed pressure vessel is that, on account of the choice of material for the connection element, it has a lower thermal capacity than a connection element of a metal for example. As a result, less heat is stored by the connection element, so that a shorter time is required for cooling down the connection element. Therefore, the cycle time for producing a pressure vessel according to the invention is shortened.

In this case, the fibre content, that is to say the proportion of fibre contained as a percentage by volume, of the connection element is between 30 and 60%, preferably between 35 and 55%, and most preferably between 40 and 50%.

The fibres used may be glass fibres, carbon fibres or aramid fibres. Glass fibres are preferred however.

The connection element may in this case comprise the following plastics: PEEK (polyether ether ketone) LCP or PPS (liquid crystal polymer or polyphenylene sulphide), PFA/FEP (perfluoroalkoxy polymers/perfluoroethylene propylene), PA4.6 (polyamide 4.6), PPA (polyphthalamides), PCT (polycyclohexylenedimethylene terephthalate), sPS (syndiotactic polystyrene), LFT (long-fibre-reinforced thermoplastic), PET (polyethylene terephthalate), PBT (polybutylene terephthalate), PA6.6 (polyamide 6.6), PA6.10 (polyamide 6.10), PK (polyketone), PA blends (polyamide blends), or PA6 (polyamide 6).

These plastics have in common that they have a crystalline or partly crystalline structure and a high temperature resistance.

An outer surface of the connection element is preferably provided at least partially with a coating of thermoplastic material. This offers the advantage that the connection element then enters into an improved and strengthened connection with the inner surface of the pressure vessel blank.

In particular in the case in which the inner layer of the pressure vessel blank consists of the barrier layer, a reliable connection of the connection element to the pressure vessel blank can thus be achieved, it still being ensured at the same time that both the connection element and the pressure vessel blank can be cooled down quickly, in particular in the contact region with the connection element, whereby the cycle time for producing a pressure vessel according to the invention is shortened.

Furthermore, the object on which the present invention is based is achieved by a process for producing a pressure vessel blank comprising at least one connection element by using an apparatus according to one of the configurations described above, the process comprising the following process steps:
 extruding a tubular extrudate;
 gripping and/or holding the preform and positioning the preform between the blow-mould halves of the blow-moulding tool located in their open position;
 separating a preform from the extrudate;
 positioning the blowing pin and the connection element held by means of the blowing pin within the tubular preform;
 transferring the blow-mould halves into their closed position while bringing the preform to bear against the connection element; and
 applying a differential pressure to the preform for moulding the pressure vessel blank in the mould impression of the blow-moulding tool.

The process is characterized in that the through-passage of the connection element held by the blowing pin is brought directly into contact with cooling fluid emerging from the fluid outlet of the blowing pin and a cooling fluid circulation is produced between the fluid outlet and the fluid inlet of the blowing pin in the through-passage of the connection element.

The process in this case preferably also comprises the following process steps:
 making the first blow-moulding tool move away from under an extrusion die head after the process steps of positioning the preform between the blow-mould halves of the first blow-moulding tool located in their open position and after the separation of the preform;
 making the second blow-moulding tool move under the extrusion die head;
 transferring the blow-mould halves of the first blow-moulding tool into their closed position while bringing the preform to bear against the connection element;
 applying a differential pressure to the preform for moulding the pressure vessel blank in the mould impression of the first blow-moulding tool;
 extruding a tubular extrudate between the blow-mould halves of the second blow-moulding tool located in their open position; and
 gripping and/or holding the preform and positioning the preform between the blow-mould halves of the second blow-moulding tool located in their open position.

A corresponding process offers the advantage that, during the final blow moulding and cooling down of the one pressure vessel blank, a further preform can be extruded, the further preform being positioned between the opened blow-mould halves of the other blow-moulding tool. In this way, consequently, no time is wasted by not being used for carrying out a process step, so that the time for producing a pressure vessel blank is shortened.

Further advantages, details and features of the invention emerge hereafter from the exemplary embodiments explained.

Specifically:

In the description that follows, the same reference signs denote the same components or the same features, so that a description of a component or a feature given with reference to one figure also applies to the other figures, thereby avoiding a repeated description.

Figure 1:
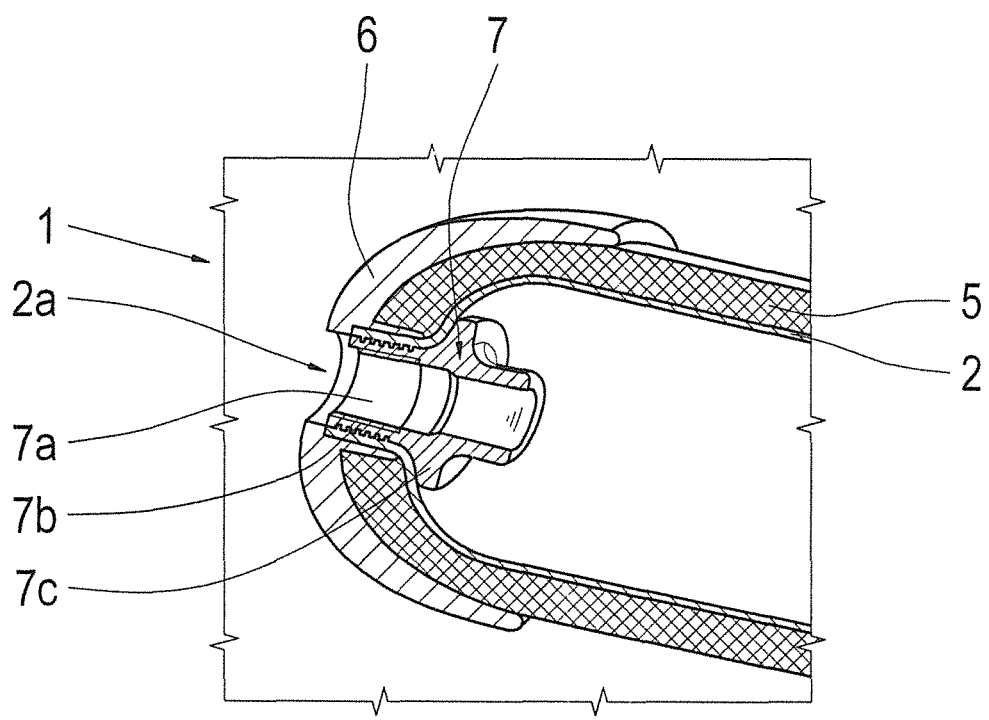
FIG. 1 shows a spatial representation of a cut-open pressure vessel in the region of the end cap.

As can be seen from FIG. 1, a pressure vessel 1 usually comprises a connection element 7, which is connected to a pressure vessel blank 2, which is also referred to as an inner vessel 2. The pressure vessel 1 also comprises a supporting shell 5, which encloses the pressure vessel blank 2. The pressure vessel 1 has at least one opening, into which the pressure vessel blank 2 opens out with a first mouth 2a. Both the opening of the pressure vessel 1 and the mouth 2a of the pressure vessel blank 2 are bounded by a neck portion 7b of the connection element 7. It is of course also possible that the pressure vessel 1 does not have just one opening, but that a further opening is provided at an opposite end of the pressure vessel 1 that is not represented in FIG. 1, there also being two connection elements 7 connected to the pressure vessel blank 2 at the two opposite end regions of the pressure vessel 1.

It can be seen from FIG. 1 that the end region of the pressure vessel 1 is provided with an impact guard 6 in the form of an impact cap 6. The impact cap 6 distributes forces exerted axially on the pressure vessel 1 over a larger surface area. These forces with at least an axial direction may occur for example in the event of an accident or in the event of the pressure vessel 1 falling.

As can be seen from FIG. 1, the connection element 7 comprises a sleeve-shaped neck portion 7b and a shoulder portion 7c integrally connected thereto. The connection element 7 is connected by way of its outer surface to an inner surface of the pressure vessel blank 2. The outer surface of the connection element 7 is the surface area that is connected to the pressure vessel blank 2, to be more precise to the inner surface of the pressure vessel blank 2.

The connection element 7, which is also referred to as an end piece, may be produced from a metal, for example from aluminium. The inner vessel 2, i.e. the pressure vessel blank 2, consists of a thermoplastic material. The thermoplastic material may have a single-layered or else a multi-layered structure. In the case of a multi-layered structure, an EVOH layer arranged in the middle may be connected by means of two coupling agents, for example in the form of LDPE layers, to two outer layers, which consist of HDPE.

However, in the case of a multi-layered structure of the pressure vessel blank 2, it may be formed from an outer stabilizing layer (for example an HDPE layer), a coupling agent layer (for example an LDPE layer) and a barrier layer, for example of EVOH or polyamide, it being possible to bring the barrier layer into direct contact with the pressurized fluid.

The supporting shell 5, which may also be referred to as the outer shell 5, is formed from a fibre-reinforced plastic. In particular, the supporting shell 5 may be formed from CRP (carbon-fibre-reinforced plastic), the plastic preferably being a thermoplastic material.

On account of the changing application of pressure to the pressure vessel 1, the connection between the connection element 7 and the pressure vessel blank 2, which may also be referred to as the inner shell 2 or lining 2 or liner 2, must be of a particularly stable configuration. On the one hand, axial forces, which are caused by the difference in pressure between the external pressure and the internal pressure of the pressure vessel 1, and on the other hand radial forces, which may cause an unscrewing of the connection element 7 from the pressure vessel 1, are transferred to the connection element 7.

In order that the pressure vessel blank 2 enters into an intimate connection with the connection element 7, before a still warm-plastic preform is brought together with the connection element 7, the latter is heated up, so that when the connection element 7 comes into contact with the still warm-plastic preform 9 the preform 9 does not cool down too quickly, so that the preform 9 can adapt itself well to the outer contour of the connection element 7 in a blow-moulding process. However, this in turn has the effect that the cooling-down process of a pressure vessel blank 2 formed in this way takes a very long time and it is in the range of several minutes before a holding device can be released from the connection element 7 without adversely influencing the form of the pressure vessel blank 2.

Figure 2:
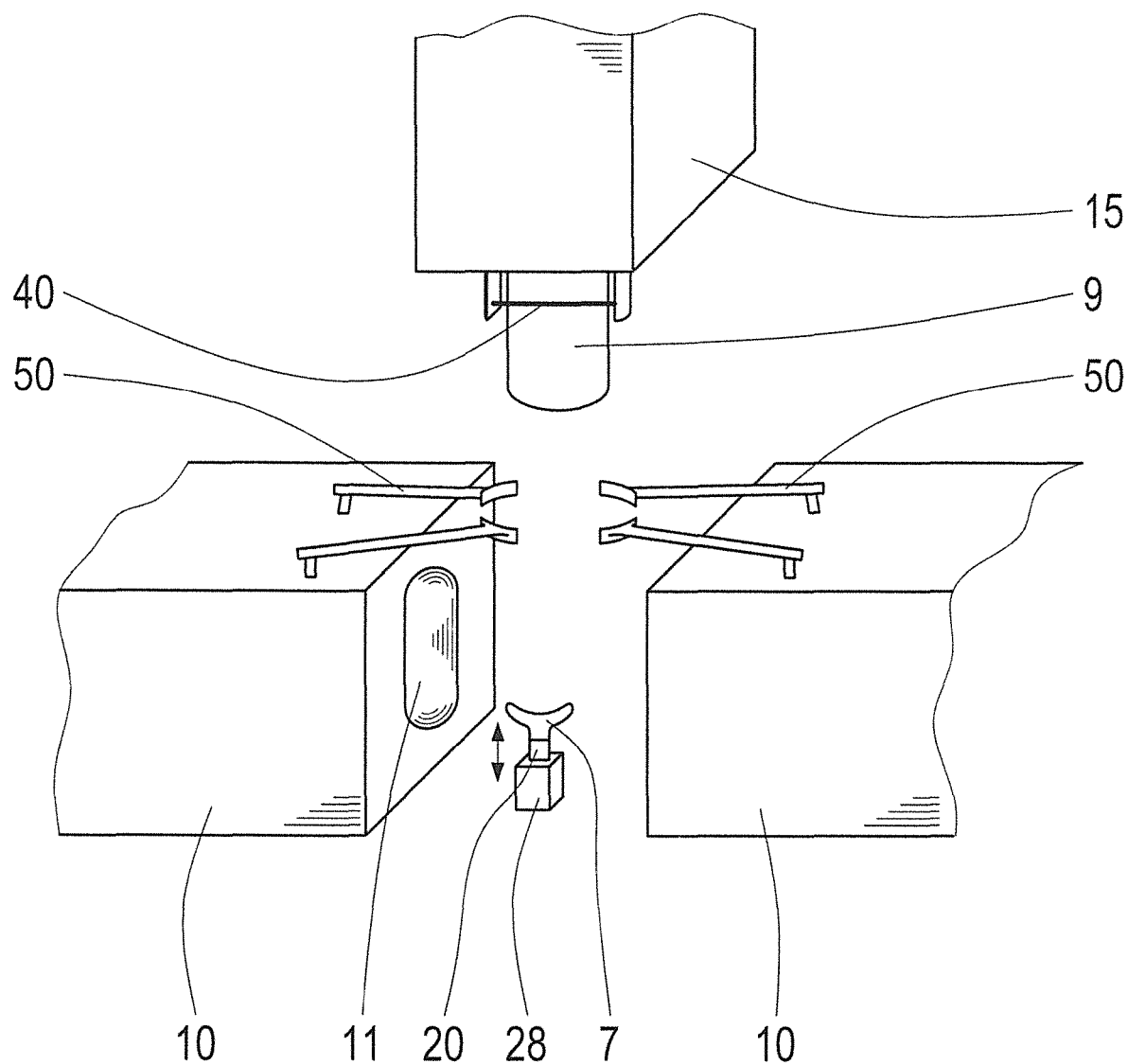
FIG. 2 shows a schematic representation of an apparatus according to the invention for producing a pressure vessel blank comprising at least one connection element according to a first embodiment of the present invention.

In FIG. 2, an apparatus for producing a pressure vessel blank 2 comprising at least one connection element 7 is schematically represented. The apparatus comprises a multi-part blow-moulding tool with two blow-mould halves 10, in each case having a partial cavity 11. The blow-mould halves 10 can be made to move between an open position, which is represented in FIG. 2 and in which the blow-mould halves 10 are apart from one another, and a closed position, which is not represented in the figures and in which the blow-mould halves 10 are in contact with one another. In the closed position, the partial cavities 11 of the two blow-mould halves 10 form a mould impression in which the preform 9 represented at the top in FIG. 2 can be moulded to form the pressure vessel blank 2 by means of applying differential pressure.

As can be seen from FIG. 2, the apparatus is arranged under an extrusion die head 15. The extrusion die head 15 extrudes a tubular preform 9, which can be separated from the extrudate by means of a separating device 40, for example a glowing wire 40. The preform 2 is extruded by means of the extrusion die head 15 between the blow-mould halves 10 located in the open position. It can also be seen from FIG. 2 that the apparatus comprises a gripping and/or holding device 50 in the form of gripping arms 50, by means of which the preform 9 can be positioned between the blow-mould halves 10. The gripping arms 50 may have at the ends part-cylindrical holding portions, at which a negative pressure can be produced, so that the preform 9 can be reliably gripped and held.

Arranged between the two blow-mould halves 10 is a blowing pin 20, which is explained and described more precisely further below in this description with reference to FIG. 3. The connection element 7 is releasably held by means of the blowing pin 20. For example, the connection element 7 may be screwed on the blowing pin 20. The blowing pin 20 can be positioned between the blow-mould halves 10 in such a way that in the closed position of the blow-mould halves 10 the preform 9 positioned between them can be moulded in the mould impression while being brought to bear against the connection element 7 by application of gas pressure by way of the blowing pin 20.

Figure 3:
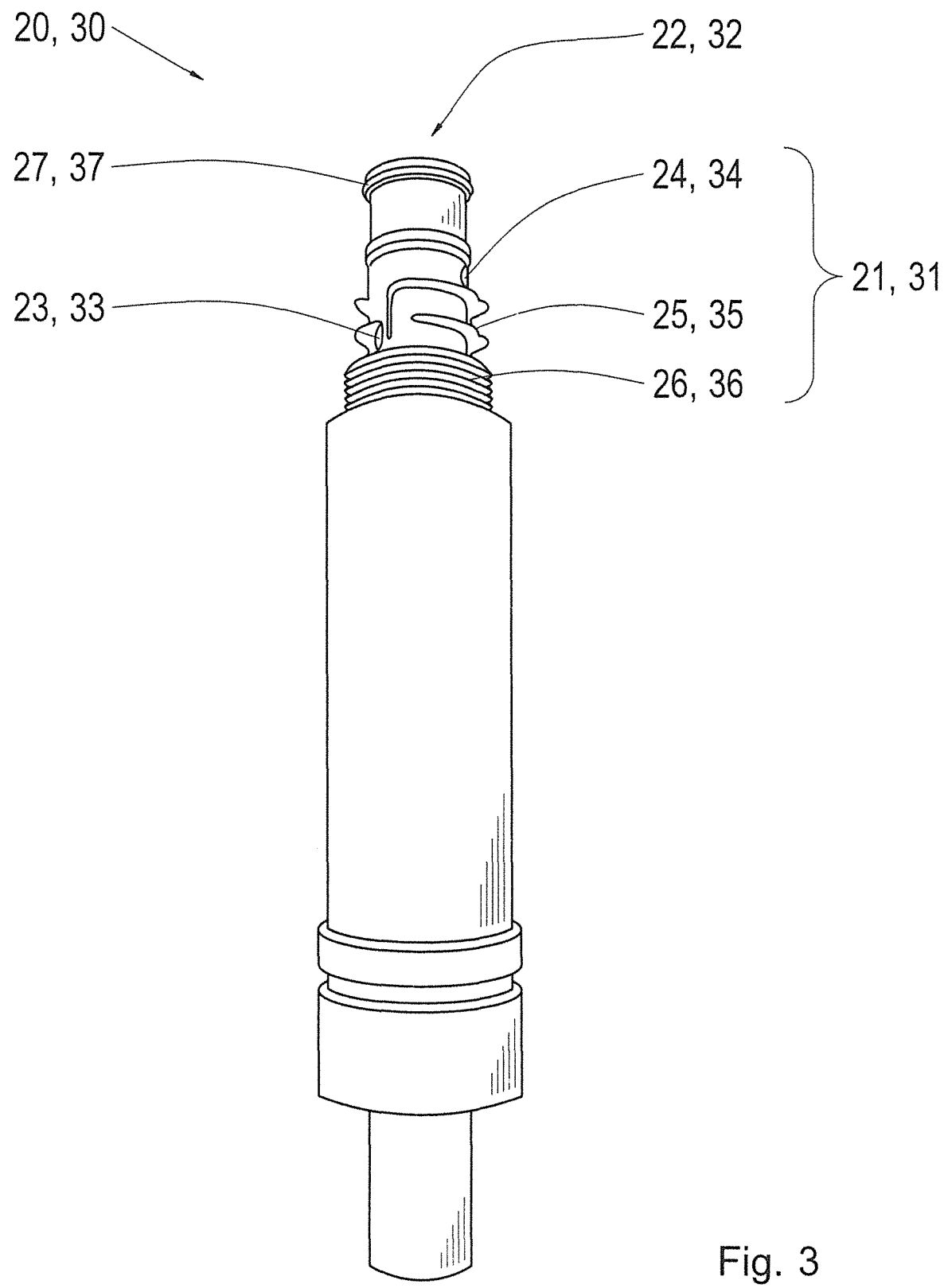
FIG. 3 shows a representation of a blowing pin/holding pin that is used in the apparatus according to the invention.

It can be seen from FIG. 3 that the blowing pin 20 has a gas outlet opening 22, arranged in an end portion 21, for discharging a gas. Furthermore, the blowing pin 20 has a holding device 26 in the form of an external thread 26 for releasably holding the connection element 7. In this case, the end portion 21 of the blowing pin 20 is insertable into a through-passage 7a (see FIG. 1) of the connection element 7. Furthermore, the blowing pin 20 has a fluid outlet 23, arranged in the end portion 21, for discharging a cooling fluid and a fluid inlet 24, likewise arranged in the end portion 21, for receiving the cooling fluid. It can also be seen from FIG. 3 that the blowing pin 20 has a wall 25, which extends substantially radially away from the cylindrical end portion 21 and forms with the through-passage 7a of the connection element 7 a fluid channel, by way of which the fluid outlet 23 is in fluidic connection with the fluid inlet 24 of the blowing pin 20. It can be seen here that the fluid channel thus formed is led around the cylindrical end portion 21. As a result, a greater length of contact and area of contact of the cooling fluid with the connection element 7, to be more precise with the through-passage 7a of the connection element 7, is obtained.

The cooling fluid flow in the through-passage 7a is directed by the wall, so that an improved heat transfer from the connection element 7 to the cooling fluid is achieved, whereby the connection element 7 can be cooled more quickly to the temperature at which the blowing pin 20 can be separated from the connection element 7 without the pressure vessel blank 2 being deformed thereby. Furthermore, the cooling of the connection element 7 ensures that the intimate connection between the pressure vessel blank 2 and the outer surface of the connection 7 is retained, since the pressure vessel blank 2 is cooled down to such a temperature that the inner surface of the pressure vessel blank 2 that is in contact with the outer surface of the connection element 7 has the same microstructure as the outer surface of the connection element 7, so that there is an interlocking between the pressure vessel blank 2 and the connection element 7 that is not broken by the cooling down of the connection element 7, for example during separation of the connection element 7 from the blowing pin 2.

As can be seen from FIG. 3, the blowing pin 20 comprises a seal 27, by means of which the through-passage 7a can be sealed off, so that no cooling fluid escapes from the through-passage 7a. The through-passage 7a is also sealed off by means of the external thread 26, so that no cooling fluid escapes from the through-passage 7a by way of this end of the blowing pin 20 either.

As can be seen from FIG. 2, the apparatus comprises a displacing device 28, by means of which the blowing pin 20, and consequently the connection element 7 held by the blowing pin 20, can be displaced and/or subjected to the application of force in the direction of the mouth 2a of the pressure vessel blank 2, into the warm-plastic preform 9. This achieves the effect that the connection element 7 is pressed with increased force into the still warm-plastic preform 9 or into the still warm-plastic pressure vessel blank 2, so that the pressure vessel blank 2 can adapt itself in an improved way to the geometry and the surface finish of the connection element 7. As a result, further improved stability of the pressure vessel blank 2 is achieved.

Figure 4:
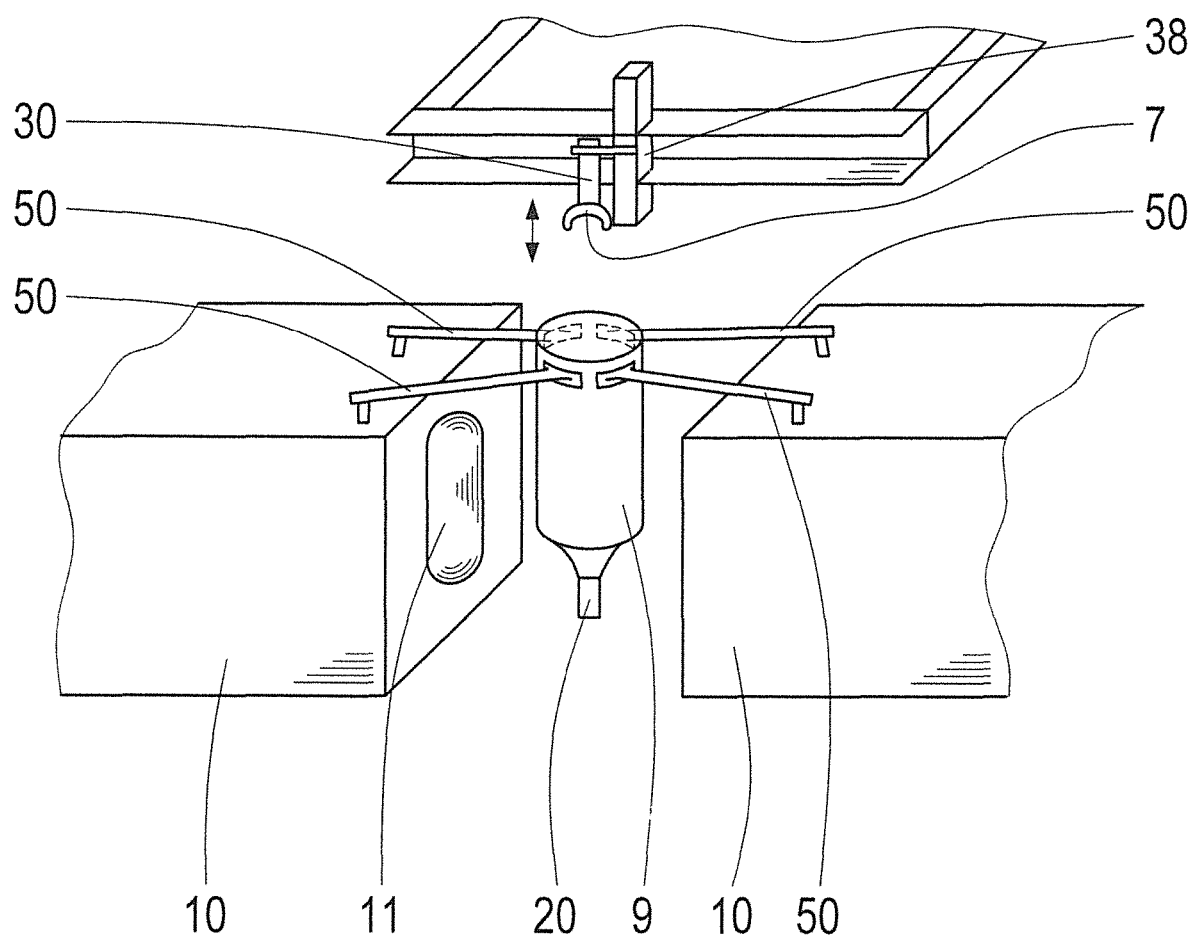
FIG. 4 shows a schematic representation of an apparatus for producing a pressure vessel blank comprising at least two connection elements according to a second embodiment of the present invention.

In FIG. 4, an apparatus for producing a pressure vessel blank 2 comprising at least two connection elements 7 according to the second embodiment of the present invention is represented. The apparatus comprises in addition to the blowing pin 20 a holding pin 30 opposite from the blowing pin 20 for releasably holding a second connection element 7. The holding pin 30, which may have a functionality identical to that of the blowing pin 20 and in the present case indeed has the same functionality (you are referred in this respect to the description with reference to FIG. 3), likewise has a holding device 36 for releasably holding the further connection element 7, an end portion 31 of the holding pin 30 being insertable into a through-passage 7a of the second connection element 7. The holding pin 30 can be positioned between the blow-mould halves 10, so that in the closed position of the blow-mould halves the preform 9 positioned between them can be moulded in the mould impression while being brought to bear against the second connection element 7 by application of gas pressure. The application of gas pressure may take place either by way of the blowing pin 20, represented at the bottom in FIG. 4, and/or by way of the holding pin 30, represented at the top in FIG. 4.

The holding pin 30 has a fluid outlet 33, arranged in the end portion 31 thereof, for discharging a cooling fluid and a fluid inlet, likewise arranged in the end portion 31, for receiving the cooling fluid. The holding pin 30 also has a wall 35, which extends substantially radially away from the cylindrical end portion 31 thereof and forms with the through-passage 7a of the second connection element 7 a fluid channel, by way of which the fluid outlet 33 is in fluidic connection with the fluid inlet 34 of the blowing pin 30. The holding pin 30 also comprises a seal 37, by means of which the through-passage 7a of the second connection element 7 can be sealed off. The external thread 36 acts as a sealing means for the connection element 7 screwed on the holding pin 30. Furthermore, as already mentioned above, the holding pin 30 has in the end portion 30 thereof a gas outlet opening 32 for discharging a gas, so that in the closed position of the blow-mould halves 10 the preform 9 positioned between them can be moulded in the mould impression while being brought to bear against the second connection element 7 by application of gas pressure by way of the gas outlet opening 32.

As can be seen from FIG. 4, the apparatus comprises a second displacing device 38, by means of which the connection element 7 held by means of the holding pin 30 can be displaced and/or subjected to the application of force in the direction of a second mouth of the pressure vessel blank 2, into the warm-plastic preform 9 or into the still warm-plastic pressure vessel blank 2. Furthermore, the holding pin 30, and consequently the second connection element 7, can be positioned within the preform by means of the second displacing device.

Although not shown in the figures, the second displacing device 38 may also be arranged on one of the blow-mould halves by means of a hinge mechanism. Once the preform 9 has been positioned between blow-mould halves 10 by means of the holding and/or gripping device 50, the second displacing device 38 can be swung or pivoted into the preform 9.

It can be seen from FIG. 4 that the blowing pin 20 and the holding pin 30 are drawn in opposite directions into the still warm-plastic preform or into the still warm-plastic pressure vessel blank 2.

Although not shown in FIG. 4, the apparatus may be displaceable transversely in relation to the direction of extrusion of the preform, so that the preform 9 can be extruded continuously and the blow moulding of a pressure vessel blank 2 can be completed by the blow-moulding tool during the extruding operation.

Figure 5:
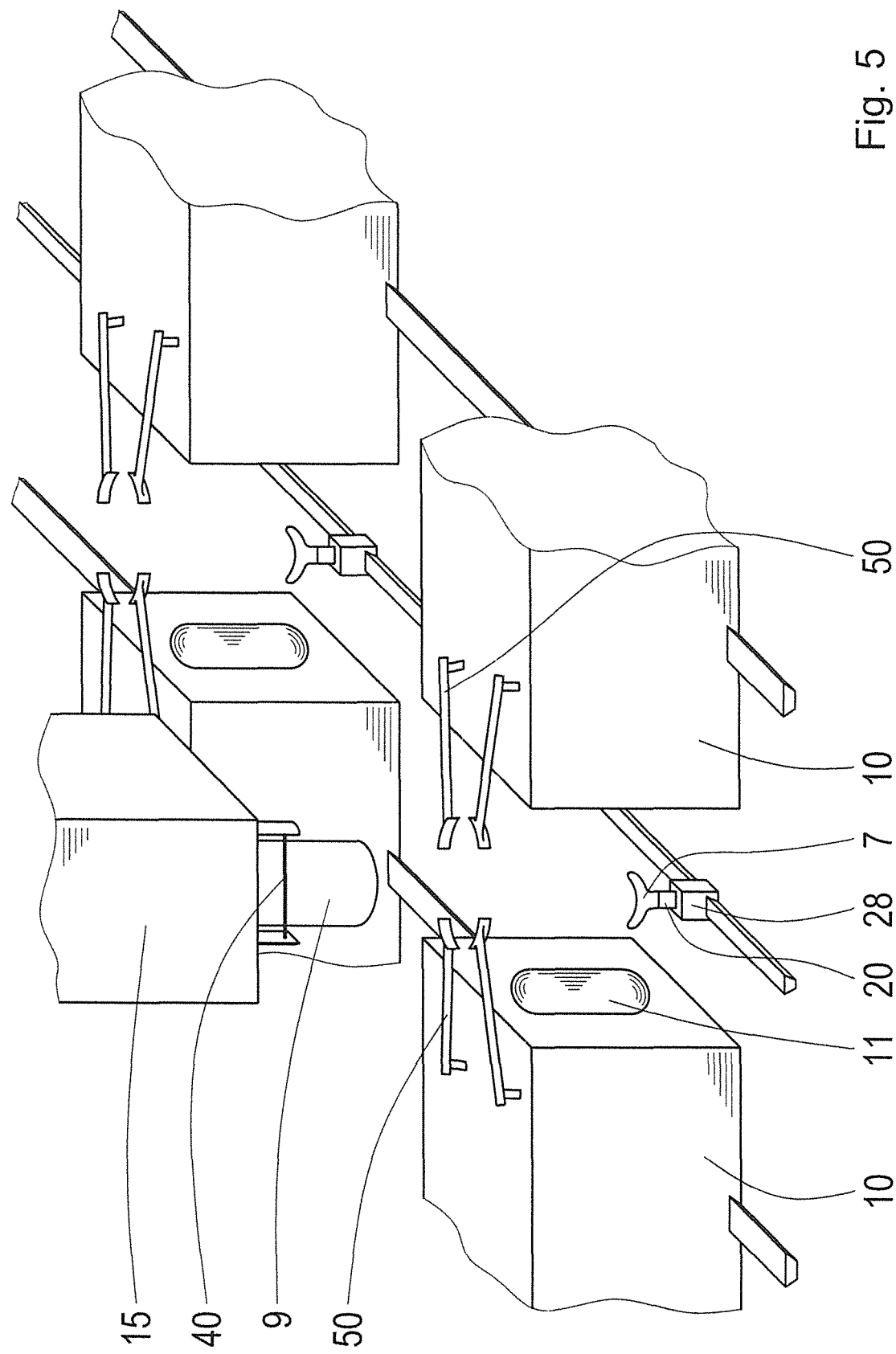
FIG. 5 shows a schematic representation of an apparatus for producing a pressure vessel blank comprising at least one connection element according to a third embodiment of the present invention.

In FIG. 5, an apparatus for producing a pressure vessel blank 2 comprising at least one connection element according to a third embodiment is represented in a schematic manner. The apparatus represented in FIG. 5 resembles very much the apparatus represented in FIG. 2, though in addition to the first blow-moulding tool, which comprises two blow-mould halves 10, a second blow-moulding tool likewise with two blow-mould halves 10 is provided and can be made to move transversely in relation to the direction of extrusion of the preform 9 and transversely in relation to the opening and closing movement of the blow-mould halves 10. To allow both the first blow-moulding tool and the second blow-moulding tool to be moved, they are arranged on a rail system. The same applies to the two blowing pins 20, which are likewise arranged on the rail system and can be displaced on it.

By means of a corresponding apparatus, a number of pressure vessel blanks 2 can be produced in parallel. In this case, the following method steps are carried out by the apparatus represented in FIG. 5:

extruding a tubular extrudate;
  gripping and/or holding the preform 9 and positioning the preform 9 between the blow-mould halves 10 of the first blow-moulding tool located in their open position;
  making the first blow-moulding tool move away from under the extrusion die head 15;
  making the second blow-moulding tool move under the extrusion die head 15;
  transferring the blow-mould halves 10 of the first blow-moulding tool into their closed position while bringing the preform 9 to bear against the connection element 7;
  applying a differential pressure to the preform 9 for moulding the pressure vessel blank 2 in the mould impression of the first blow-moulding tool;
  bringing the through-passage 7a of the connection element 7 held by the blowing pin 20 directly into contact with cooling fluid emerging from the fluid outlet 23 of the blowing pin 20 and producing a cooling fluid circulation between the fluid outlet 23 and the fluid inlet 24 of the blowing pin 20 in the through-passage 7a of the connection element 7 (of the first blow-moulding tool);
  extruding a tubular extrudate between the blow-mould halves 10 of the second blow-moulding tool located in their open position; and gripping and/or holding the preform 9 and positioning the preform 9 between the blow-mould halves 10 of the second blow-moulding tool located in their open position.

Therefore, the apparatus represented in FIG. 5 uses the time that is necessary for completing the blow moulding of the pressure vessel blank 2 located in the first blow-moulding tool and cooling it down to the temperature at which the blow-moulding tool can be transferred again into the open position without deformation of the pressure vessel blank 2 having to be feared for extruding a further preform 9 and for positioning/placing the preform between the opened blow-mould halves of the second blow-moulding tool. If appropriate, it is then possible for the blow-mould halves of the second blow-moulding tool to be closed already during the cooling process of the pressure vessel blank 2 located in the first blow-moulding tool, once the latter has been moved away from under the extrusion die head 15 and the preform 9 has been separated from the extrudate.

LIST OF REFERENCE SIGNS

1 Pressure vessel
2 Pressure vessel blank/inner vessel/lining/liner (of the pressure vessel)
2a (First) mouth (of the pressure vessel blank)
5 Supporting shell (of the pressure vessel)
6 Impact guard/impact cap (of the pressure vessel)
7 (First) connection element/second connection element/end piece
7a Through-passage (of the (first) connection element)
7b Neck portion (of the connection element)
7c Shoulder portion (of the connection element)
9 Preform
10 Blow-mould half
11 Cavity/partial cavity/recess (of the blow-mould half)
15 Extrusion die head
20 Blowing pin
21 End portion (of the blowing pin)
22 Gas outlet opening (of the blowing pin)
23 Fluid outlet (of the blowing pin)
24 Fluid inlet (of the blowing pin)
25 Wall (of the blowing pin)
26 Holding device/thread/external thread (of the blowing pin)
27 Seal (of the blowing pin)
28 (First) displacing device
30 Holding pin
31 End portion (of the holding pin)
32 Gas outlet opening (of the holding pin)
33 Fluid outlet (of the holding pin)
34 Fluid inlet (of the holding pin)
35 Wall (of the holding pin)
36 Holding device/thread/external thread (of the holding pin)
37 Seal (of the holding pin)
38 (Second) displacing device
40 Separating device/glowing wire
50 Gripping and/or holding device

The invention claimed is:

1. An apparatus for producing a pressure vessel blank (2) comprising
(a) at least one connection element (7) comprising a through-passage (7a);
(b) a multi-part blow-moulding tool comprising at least two blow-mould portions (10), wherein each blow-mould portion (10) defines a partial cavity (11) configured to receive a thermoplastic tubular preform (9); and
(c) at least one blowing pin (20) comprising an end portion (21) having a gas outlet opening (22), configured to discharge a gas, and a holding device (26) for releasably holding the connection element (7), wherein the end portion (21) is configured for insertion into the through-passage (7a) of the connection element (7);
wherein the blow-mould portions (10) are configured to move reversibly between an open position in which the blow-mould portions (10) are apart from one another, and a closed position in which the blow-mould portions (10) contact one another such that the partial cavities (11) of each blow-mould portion (10) form a mould impression in which the thermoplastic preform (9) can be moulded under differential pressure to form the pressure vessel blank (2);
wherein the blowing pin (20) is configured for placement between the blow-mould portions (10) so that in the closed position the thermoplastic preform (9) disposed therebetween can be moulded in the mould impression while being brought to bear against the connection element (7) by application of gas pressure discharged from the gas outlet opening (22);
wherein the end portion of the blowing pin (20) further comprises a fluid outlet (23), configured to release a cooling fluid, and a fluid inlet (24) configured to receive the cooling fluid; and
wherein the fluid outlet (23) and the fluid inlet (24) are configured for fluidic connection with one another, so that, in use, the through-passage (7a) of the connection element (7) held by the blowing pin (20) can be brought directly into contact with the cooling fluid and a cooling fluid circulation can be produced in the through-passage (7a) of the connection element (7).

2. The apparatus of claim 1, further comprising a second multi-part blow-moulding tool, at least one second connection element, and at least one second blowing pin, each as described in claim 1, wherein the first blow-moulding tool and the second blow-moulding tool are configured for movement under an extrusion die head (15), wherein said movement is transverse both in relation to a direction of extrusion of the thermoplastic preform (9) and in relation to a direction of the opening and closing of the blow-mould portions (10).

3. The apparatus of claim 1, wherein the blowing pin (20) further comprises a wall (25) extending substantially radially away from the end portion (21) such that when the end portion of the blowing pin is received in the through-passage (7a) of the connection element (7) the configuration forms a fluid channel in which the fluid outlet (23) is in fluidic connection with the fluid inlet (24) of the blowing pin (20).

4. The apparatus of claim 1, wherein the blowing pin (20) further comprises a seal (27), configured to prevent cooling fluid escape from the through-passage (7a).

5. The apparatus of claim 1, wherein the holding device (26) of the blowing pin (20) adjoins the end portion (21) thereof is configured to prevent escape of cooling fluid from the through-passage (7a).

6. The apparatus of claim 1, further comprising at least one displacing device (28) configured to move the connection element (7) in the direction of a mouth (2a) of a pressure vessel blank (2) disposed adjacent thereto, and into the thermoplastic preform (9) to thin the thermoplastic preform (9) connected to the connection element (7).

7. The apparatus of claim 1, further comprising
a further connection element (7); and
a holding pin (30) configured to releasably hold the further connection element (7);
wherein the holding pin (30) comprises a holding device (36) for releasably holding the further connection element (7),
wherein the holding pin (30) comprises an end portion (31) configured to insert into a through-passage (7a) of the further connection element (7);
wherein the holding pin (30) is configured to be positioned between the blow-mould portions (10) so that when the blow-mould portions (10) are in the closed position, the thermoplastic preform (9) positioned therebetween can be moulded in the mould impression while being brought to bear against the further connection element (7) by application of gas pressure;
wherein the end portion of the holding pin (30) further comprises a fluid outlet (33) configured to discharge a cooling fluid and a fluid inlet (34) configured to receive the cooling fluid; and
wherein the fluid outlet (33) and the fluid inlet (34) are disposed in fluidic connection with one another, so that the through-passage (7a) of the further connection element (7) held by the holding pin (30) can be brought directly into contact with the cooling fluid and a cooling fluid circulation can be produced in the through-passage (7a) of the second connection element (7).

8. The apparatus of claim 7, wherein the holding pin (30) further comprises a gas outlet opening (32) in the end portion (31) thereof, configured to discharge a gas, wherein in the closed position of the blow-mould portions (10), the thermoplastic preform (9) therebetween can be moulded in the mould impression while being brought to bear against the further connection element (7) by application of gas pressure through the gas outlet opening (32) of the holding pin (30).

9. The apparatus of claim 7, wherein the holding pin (30) comprises a wall extending substantially radially away from the end portion (31) and configured to form, with the through-passage (7a) of the further connection element (7), a fluid channel in which the fluid outlet (33) is in fluidic connection with the fluid inlet (34) of the holding pin (30).

10. The apparatus of claim 7, wherein the holding pin (30) further comprises a seal (37) configured to prevent escape of cooling fluid from the through-passage (7a).

11. The apparatus of claim 7, wherein the holding device (36) of the holding pin (30) is configured to adjoin the end portion (31) thereof, thereby preventing escape of cooling fluid from the through-passage (7a).

12. The apparatus of claim 7, comprising a second displacing device (38) configured to move the further connection element (7) held by the holding pin (30) in the direction of a mouth of a pressure vessel blank (2) disposed adjacent thereto, into the thermoplastic preform (9) to thin the material of the preform connected to the further connection element (7).

13. The apparatus of claim 12, wherein a displacement force is applied to the first connection element (7) in a direction opposed to the direction of a displacement force that is applied to the further connection element (7).

14. The apparatus of claim 13, wherein the displacement force applied to the first connection element (7) takes place substantially at the same time as the displacement force applied to the further connection element (7).

15. The apparatus of claim 1, further comprising
a separating device (40) configured to separate the preform (9) from an extrudate extruded from an extrusion die head (15); and
a gripping and/or holding device (50) for gripping and/or holding the preform (9) between the blow-mould portions (10) when said portions are in the open position.

16. The apparatus of claim 1, wherein said apparatus is displaceable transversely in relation to a direction of extrusion of the thermoplastic preform (9).

17. A process for producing a pressure vessel blank (2) comprising at least one connection element by using the apparatus of claim 1, comprising the steps of
(a) extruding a tubular extrudate;
(b) gripping and/or holding the preform (9) and positioning the preform (9) between open blow-mould portions (10) of the blow-moulding tool;
(c) separating the preform (9) from the extrudate;
(d) positioning the blowing pin (20) and the connection element (7) within the tubular preform (9);
(e) closing the blow-mould portions (10) while bringing the preform (9) to bear against the connection element (7); and
(f) applying differential pressure to the preform (9) for moulding the pressure vessel blank (2) within the mould impression of the closed blow-moulding tool;
wherein the through-passage (7a) of the connection element (7) held by the blowing pin (20) is brought directly into contact with cooling fluid emerging from the fluid outlet (23) of the blowing pin (20) and a cooling fluid circulation is produced between the fluid outlet (23) and the fluid inlet (24) of the blowing pin (20) in the through-passage (7a) of the connection element (7).

18. A process for producing a pressure vessel blank (2) comprising at least one connection element by using the apparatus of claim 2, comprising
(a) extruding a tubular extrudate;
(b) gripping and/or holding the preform (9) and positioning the preform (9) between open blow-mould portions (10) of the blow-moulding tool;
(c) separating the preform (9) from the extrudate;
(d) positioning the blowing pin (20) and the connection element (7) within the tubular preform (9);
(e) closing the blow-mould portions (10) while bringing the preform (9) to bear against the connection element (7); and
(f) applying differential pressure to the preform (9) for moulding the pressure vessel blank (2) within the mould impression of the closed blow-moulding tool;
(g) translocating the first blow-moulding tool from under an extrusion die head after positioning the preform (9) between the open blow-mould portions (10) of the first blow-moulding tool after the separation of the preform (9);
(h) translocating the second blow-moulding tool under the extrusion die head (15);
(i) closing the blow-mould portions (10) of the first blow-moulding tool while bringing the preform (9) to bear against the connection element (7);
(j) applying a differential pressure to the preform (9) for moulding the pressure vessel blank (2) in the mould impression of the first blow-moulding tool;
(k) extruding a tubular extrudate between the open blow-mould portions (10) of the second blow-moulding tool; and (l) gripping and/or holding the preform (9) and positioning the preform (9) between the open blow-mould portions (10) of the second blow-moulding tool;

wherein the through-passage (7*a*) of the connection element (7) held by the blowing pin (20) is brought directly into contact with cooling fluid emerging from the fluid outlet (23) of the blowing pin (20) and a cooling fluid circulation is produced between the fluid outlet (23) and the fluid inlet (24) of the blowing pin (20) in the through-passage (7*a*) of the connection element (7).

19. The process of claim 17, wherein after bringing the preform (9) to bear against the connection element (7) and during and/or after applying differential pressure to the preform (9), the connection element (7) is moved in the direction of the mouth of the pressure vessel blank (2) into a thermoplastic preform (9).

20. The process according to claim 17, further comprising positioning the holding pin (30) and the second connection element (7) held by the holding pin (30) within the tubular preform (9); and closing the blow mould portions (10) while bringing the preform (9) to bear against the first connection element (7) and against the second connection element (7).

21. The process according to claim 20, wherein after applying differential pressure to the preform (9), the through-passage (7*a*) of the second connection element (7) held by the holding pin (30) is brought directly into contact with cooling fluid emerging from the fluid outlet (33) of the holding pin (30) and a cooling fluid circulation between the fluid outlet (33) and the fluid inlet (34) of the holding pin (30) is produced in the through-passage (7*a*) of the second connection element (7).

22. The process according to claim 21, wherein after bringing the preform (9) to bear against the first connection element (7) and against the second connection element (7) and during and/or after applying differential pressure to the preform (9), the first connection element (7) is moved in the direction of the mouth of the pressure vessel blank (2), into a warm-plastic preform, (9) and the second connection element (7) is moved in the direction of a second mouth of the pressure vessel blank (2) into a thermoplastic preform (9).

\* \* \* \* \*